(12) United States Patent
Pieri et al.

(10) Patent No.: US 11,711,486 B2
(45) Date of Patent: Jul. 25, 2023

(54) IMAGE CAPTURE METHOD AND SYSTEMS TO PRESERVE APPARENT CONTRAST OF AN IMAGE

(71) Applicant: Dolby Laboratories Licensing Corporation, San Francisco, CA (US)

(72) Inventors: Elizabeth G. Pieri, Campbell, CA (US); Robin Atkins, Vancouver (CA); Jaclyn Anne Pytlarz, Santa Clara, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 17/253,600

(22) PCT Filed: Jun. 13, 2019

(86) PCT No.: PCT/US2019/037066
§ 371 (c)(1),
(2) Date: Dec. 17, 2020

(87) PCT Pub. No.: WO2019/245876
PCT Pub. Date: Dec. 26, 2019

(65) Prior Publication Data
US 2021/0250564 A1    Aug. 12, 2021

Related U.S. Application Data

(60) Provisional application No. 62/686,371, filed on Jun. 18, 2018.

(30) Foreign Application Priority Data

Jun. 18, 2018  (EP) .................................. 18178266

(51) Int. Cl.
*H04N 5/58*     (2006.01)
*H04N 1/60*     (2006.01)
(Continued)

(52) U.S. Cl.
CPC ............. *H04N 5/58* (2013.01); *H04N 1/6088* (2013.01); *H04N 5/20* (2013.01); *H04N 5/202* (2013.01);
(Continued)

(58) Field of Classification Search
CPC .......... H04N 5/2352; H04N 5/57; H04N 5/58; H04N 9/643; H04N 9/68; H04N 9/73;
(Continued)

(56) References Cited

U.S. PATENT DOCUMENTS 7,023,580 B2   4/2006  Zhang
7,999,863 B2   8/2011  Nakamura
(Continued)

FOREIGN PATENT DOCUMENTS

CN   103391404 B   11/2013
CN   107211076 B    9/2017
(Continued)

OTHER PUBLICATIONS

G. Krawczyk, M. Goesele, & H.P. Seidel, "Photometric Calibration of High Dynamic Range Cameras", Max-Plank-Institut für Informatik (May 2005) (Year: 2005).*

(Continued)

*Primary Examiner* — David N Werner

(57) ABSTRACT

Methods and systems are described for processing an image captured with an image sensor, such as a camera. In one embodiment, an estimated ambient light level of the captured image is determined and used to compute an optical-optical transfer function (OOTF) that is used to correct the image to preserve an apparent contrast of the image under the estimated ambient light level in a viewing environment. The estimated ambient light level is determined by scaling pixel values from the image sensor using a function that
(Continued)

includes exposure parameters and a camera specific parameter derived from a camera calibration.

13 Claims, 4 Drawing Sheets

(51) Int. Cl.
| | |
|---|---|
| *H04N 9/64* | (2023.01) |
| *H04N 9/79* | (2006.01) |
| *H04N 23/71* | (2023.01) |
| *H04N 23/75* | (2023.01) |
| *H04N 5/57* | (2006.01) |
| *H04N 5/20* | (2006.01) |
| *H04N 5/202* | (2023.01) |

(52) U.S. Cl.
CPC ............... *H04N 5/57* (2013.01); *H04N 9/643* (2013.01); *H04N 9/79* (2013.01); *H04N 23/71* (2023.01); *H04N 23/75* (2023.01)

(58) Field of Classification Search
CPC ........... H04N 9/77; H04N 9/793; H04N 5/20; H04N 5/202
See application file for complete search history.

(56) References Cited

U.S. PATENT DOCUMENTS

| | | | |
|---|---|---|---|
| 8,237,813 B2 | 8/2012 | Garten | |
| 8,847,972 B2 | 9/2014 | Kane | |
| 9,055,227 B2 | 6/2015 | Batur | |
| 9,432,647 B2 | 8/2016 | Tajbakhsh | |
| 9,734,635 B1 | 8/2017 | Gorumkonda | |
| 9,961,237 B2 | 5/2018 | Atkins | |
| 2011/0279710 A1* | 11/2011 | Lee | H04N 5/2351 348/E9.053 |
| 2014/0029675 A1* | 1/2014 | Su | G06F 17/18 375/240.16 |
| 2015/0078661 A1 | 3/2015 | Granados | |
| 2016/0358346 A1 | 12/2016 | Hendry | |
| 2016/0360214 A1* | 12/2016 | Sole Rojals | H04N 9/68 |
| 2017/0034519 A1 | 2/2017 | Rosewarne | |
| 2017/0034520 A1 | 2/2017 | Rosewarne | |
| 2017/0061664 A1 | 3/2017 | Ishii | |
| 2017/0085833 A1* | 3/2017 | Toma | H04N 9/642 |
| 2017/0099445 A1 | 4/2017 | Manabe | |
| 2017/0111643 A1 | 4/2017 | Bugdayci Sansli | |
| 2017/0125063 A1 | 5/2017 | Atkins | |
| 2017/0155903 A1 | 6/2017 | Rosewarne | |
| 2017/0289571 A1 | 10/2017 | El Mezeni | |
| 2017/0345392 A1 | 11/2017 | Matsubayashi | |
| 2017/0359498 A1 | 12/2017 | Benchemsi | |
| 2018/0089811 A1* | 3/2018 | Shin | G03B 27/80 |
| 2020/0013151 A1 | 1/2020 | Atkins | |
| 2020/0074959 A1* | 3/2020 | Bhat | G09G 5/10 |

FOREIGN PATENT DOCUMENTS

| | | | |
|---|---|---|---|
| CN | 107851421 A | 3/2018 | |
| GB | 2526047 | 11/2015 | |
| JP | 2009171062 A | 7/2009 | |
| KR | 20040097683 A | 11/2004 | |
| WO | 2013086169 | 6/2013 | |
| WO | 2014130343 | 8/2014 | |
| WO | 2016118395 | 7/2016 | |
| WO | WO-2016147625 A1 * | 9/2016 | ............... H04N 5/20 |
| WO | 2017001858 A1 | 1/2017 | |
| WO | 2018055945 | 3/2018 | |

OTHER PUBLICATIONS

Goossens, B. et al "Realistic camera noise modeling with application to improved HDR synthesis" EURASIP J. Adv. Signal Process, 2012.

ITU-R BT.2100-0 "Image Parameter Values for High Dynamic Range Television for Use in Production and International Programme Exchange" Jul. 2016.

Reinhard, E. et al "Photographic Tone Reproduction for Digital Images" ACM Transactions on Graphics, No. 3, pp. 267-276, Jul. 2002.

Tumblin, J. et al "Tone Reproduction for Realistic Images" IEEE Computer Graphics and Applications, No. 6, pp. 42-48, 1993.

* cited by examiner

IMAGE CAPTURE METHOD AND SYSTEMS TO PRESERVE APPARENT CONTRAST OF AN IMAGE

CROSS REFERENCE TO RELATED APPLICATIONS

This application claims priority to U.S. Provisional Application No. 62/686,371, filed Jun. 18, 2018 and European Patent Application No. 18178266.5, filed Jun. 18, 2018, each of which is incorporated by reference in their entirety herein.

TECHNOLOGY

The present invention relates generally to images. More particularly, an embodiment of the present invention relates to images captured with a camera or other device.

BACKGROUND

Image processing operations are often used to transform scene images from the original scene captured by a camera to display images rendered on one or more display devices of various display capabilities (for example, a target display), and these operations may not preserve contrasts and chromaticities of the scene image of the original scene when displayed on the target display. For example, in terms of human visual perception, the display images as rendered on a target display may appear different in contrast and chromaticity from what a viewer views or a camera captures from the original scene in situ. And this is true even when sophisticated image processing techniques, such as Dolby's Display Management technology are used.

As used herein, the terms "display management" or "display mapping" denote the processing (e.g., tone and gamut mapping) required to map images or pictures of an input video signal of a first dynamic range (e.g., 1000 nits) to a display of a second dynamic range (e.g., 500 nits) with a target display that may have a limited color gamut. Examples of display management processes can be found in PCT Patent Application Ser. No. PCT/US2016/013352 (to be referred to as the '352 Application), filed on Jan. 14, 2016, titled "Display management for high dynamic range images," which is incorporated herein by reference in its entirety.

In a typical content creation pipeline, video is color graded in an ambient environment of 5 nits. In practice, viewers may display content in a variety of ambient environments, say, at 5 nits (e.g., watching a movie in a dark home theater), at 100-150 nits (e.g., watching a movie in a relatively bright living room), or higher (e.g., watching a movie on a tablet in a very bright room or outside, in daylight).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
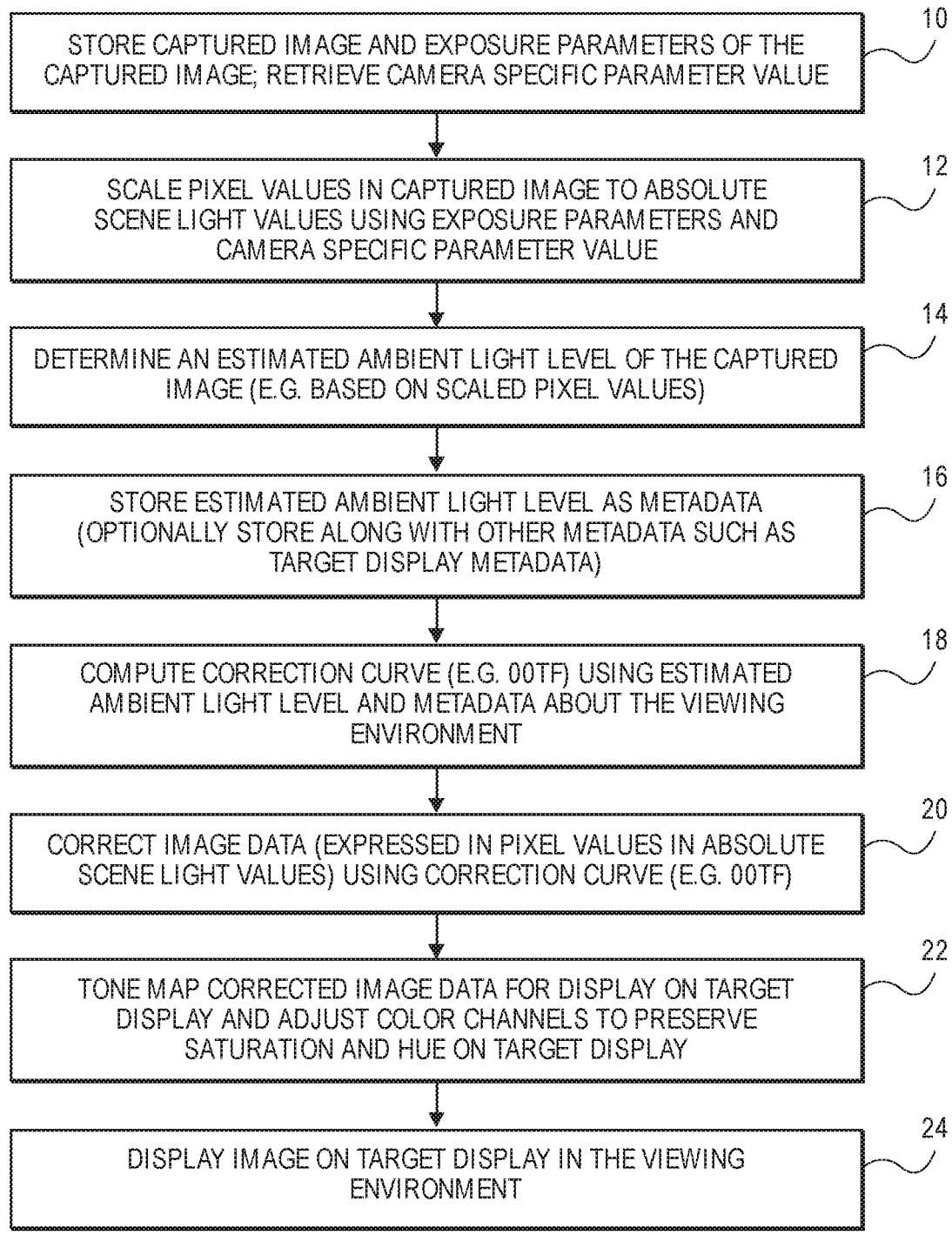
FIG. 1 shows, in flowchart form, an example of one or more embodiments of the invention.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

The embodiments described herein can be used to consistently achieve good looking high dynamic range and standard dynamic range images and video from content captured by devices such as cameras or smart phones or other devices including cameras. Using information about exposure and characteristics of the device on which an image was captured, the embodiments can determine the absolute brightness levels in the scene of the image which can then be used to predict the surrounding conditions of the image. Combining this information with knowledge about human perception of brightness and color, the captured image can be mapped to various displays in a way that best preserves the look of the scene in the original environment of the scene while displaying the image in a viewing environment which may be different than the ambient environment of the original scene.

The visual appearance of the original scene to a viewer in situ at the original scene, as captured by the scene images, may be referred to as scene-referred visual appearance. The visual appearance of display images derived/transformed from the scene images, as rendered on display devices, may be referred to as display-referred visual appearance.

As used herein, the term "visual appearance" refers to a combination of visually perceivable contrasts and visually perceivable chromaticities (hues and saturations); or refers to a combination of visually perceivable contrasts and visually perceivable hues.

Techniques as described herein can be applied to ensure that the display-referred visual appearance of the original scene faithfully (e.g., perfectly, perceptually, below human noticeable thresholds, within a relatively small error, etc.) reproduces the scene-referred visual appearance of the original scene. It should be noted that in some embodiments, the scene-referred visual appearance of the original scene may refer to a visual appearance of the original scene with specific camera settings and specific camera image signal processing (camera ISP) selected with intent to generate pleasing scene images from the original scene.

The display images generated and rendered under techniques as described herein allow viewers (e.g., humans, etc.) to perceive the same visual appearance as that of the original scene or the original scene with an element of a viewer specified preference. The viewers can see from the display images what a viewer (or a virtual viewer) would see in situ at the original scene, in terms of the scene-referred visual appearance of the original scene.

A method according to one embodiment can include the following operations: capturing an image through a camera, the captured image including a first plurality of image data representing pixels in the image; determining an estimated ambient light level of the captured image based on the first plurality of image data, wherein the estimated ambient light level is determined by scaling pixel values from a sensor in the camera using a function that includes a camera specific parameter and exposure parameters (used on the camera when the image was captured) to obtain one or more absolute scene light levels, the exposure parameters including an aperture setting, an exposure time setting and a sensor sensitivity setting, and wherein the camera specific parameter is derived from a camera calibration; computing an optical-optical transfer function (OOTF) based on an estimated ambient light level; transforming image data derived from the first plurality of image data by correcting the image data derived from the first plurality of image data using the OOTF, the transforming configured to preserve an apparent contrast of the image under the estimated ambient light level in a viewing environment when the image is displayed in the viewing environment. In one embodiment, the optical-optical transfer function can compensate for human perception in different ambient light conditions to thereby preserve the appearance of the image from the scene environment in which the image was captured. In one embodiment, the method can be adapted to provide display management across a plurality of different target displays to achieve substantially the same appearance across the different target displays from the captured image. In one embodiment, the method can include mapping, through a tone mapping function configured for a target display, image data derived from the first plurality of image data to map the image for display on the target display, wherein the tone mapping function is configured based on the gamut and luminance parameters of the target display. In one embodiment, the transforming can correct the image data derived from the first plurality of image data before the mapping through the tone mapping function such that the tone mapping function operates on data derived from the transforming. In one embodiment, the tone mapping function can compress a dynamic range of the image to match the gamut and luminance parameters of the target display. In another embodiment, the transforming and mapping can be performed simultaneously by a tone mapping function which incorporates the OOTF.

In one embodiment, the estimated ambient light level is saved as metadata with image data of the image, and the tone mapping is performed on pixel values which have been scaled to absolute scene light levels. In one embodiment, the camera specific parameter can be a constant value that is derived empirically from a camera calibration operation. In one embodiment, the camera calibration operation can include: capturing images of a test target at different exposure parameter settings (e.g. all of the possible different exposure parameters settings or a subset of all such settings) and measuring the luminance of the test target (at the camera's position) and solving for a value of the constant value that best fits a function that includes the camera specific parameter and the exposure parameters used during the calibration process. In one embodiment, the camera specific parameter is derived from camera calibration of the camera and then stored for use in similar cameras having the same sensor design as the camera which was calibrated.

In one embodiment, the estimated ambient light levels can be derived from one of: a median or mean of luminance values of all pixels (or a subsampled set of all pixels) in the image; a median or mean of luminance values of a portion of the image (such as a face or other salient portion of the image); a median or mean of luminance values in a selected range of luminance values between a maximum luminance value in the image and a minimum luminance value in the image; a maximum luminance value in the image; an ambient light sensor reading; an exposure sensor reading; and data from pixels dedicated to optimizing exposure; or a manual user input.

In one embodiment, the OOTF corrects the image data based on a difference between the estimated ambient light and a predetermined or dynamically measured ambient light of the viewing environment, and wherein the OOTF corrects the image data when the camera was set in automatic exposure mode but the image is displayed, without the OOTF correction, on the target display in the target viewing environment when the camera was set with a manual exposure adjustment. In one embodiment, the manual exposure adjustment can be one of: a manual exposure setting or an exposure compensation setting that was manually selected such as an underexposure or an over exposure setting set by a user when the image was captured. In one embodiment the predetermined ambient light of the viewing environment can be five (5) nits. In one embodiment, the dynamically measured ambient light of the viewing environment can be measured by an ambient light sensor that is integrated into the target display so that the OOTF is dynamically controlled by the output of the ambient light sensor.

In one embodiment, the OOTF corrects the image data when the camera was used in automatic exposure mode but the image is displayed, without the OOTF of correction, on the target display in the viewing environment when the camera was set with a manual exposure adjustment. In one embodiment, the camera can be one of: a camera integrated into a smart phone; a camera integrated into a tablet computer; a single lens reflex camera; a mirrorless camera; or a device that includes a lens that focuses the image onto the sensor, a storage device and a control system coupled to the sensor and the storage device.

In one embodiment the method can further include estimating a white point of the image using the absolute light levels and applying a chromatic adapting transformation to convert the image to a reference adapting white point.

In one embodiment, the OOTF preserves the apparent contrast by adjusting image data in relatively dark regions of the image to reduce contrast in the relatively dark regions when the estimated ambient light level has a higher luminance than the luminance of the viewing environment, and the OOTF preserves the apparent contrast by adjusting image data in relatively dark regions of the image to increase contrast in the relatively dark regions of the image when the estimated ambient light level has a lower luminance than the luminance of the viewing environment.

In one embodiment, the metadata can be used to compensate for flare in the image, where the flare compensation is a function of a value representing the estimated ambient light level. In this embodiment, the metadata can include metadata about the absolute scene light level which has been derived as described herein.

In one embodiment, the tone mapping function can include local tone mapping in one or more regions of the image, and the local tone mapping can be used during mapping to create a standard dynamic range image from the captured image. In one embodiment, the metadata can be saved with the standard dynamic range image for use in reconstructing a high dynamic range image via inverse mapping. In one embodiment, the metadata can be used to calculate multivariate, multiple regression (MMR) coefficients for inverse mapping from the standard dynamic range image to the high dynamic range image.

The embodiments described herein can be used in apparatuses which include one or more processors in a processing system and which include memory and which are configured to perform any one of the methods described herein. Moreover, the embodiments described herein can be implemented using non-transitory machine readable storage media storing executable computer program instructions which when executed by a machine cause the machine to perform any one of the methods described herein.

FIG. 1 shows an example of a method according to one embodiment of the invention. In operation 10, a device can store a captured image and the exposure parameters which were used to capture the image. In one embodiment, the device can be a camera and the exposure parameters can include an aperture setting, an exposure time setting, and a sensor's sensitivity setting. In one embodiment, the captured image can be associated with a specific camera parameter value which is derived from a camera calibration operation for the particular camera. An example of a camera calibration operation is described below. The camera specific parameter value can be retrieved for use in processing the captured image. In operation 12, the device can scale pixel values in the captured image to generate absolute scene light values using the exposure parameters which are used when the image was captured as well as the camera specific parameter value. The scaling of the pixel values can be performed using the luminance channel of each pixel to derive absolute scene light level values for each pixel which can be then used in later operations to estimate the ambient light level of the scene. In one embodiment, the following scaling equation can be used to derive absolute scene levels from the luminance channel of each pixel in the image.

$$\text{Absolute Luminance} = \frac{(\text{Relative Camera Exposure} * \text{Aperture}^2)}{(\text{Exposure Time} * ISO) * k}$$

wherein Relative Camera Exposure can represent a per pixel exposure value derived from the image sensor's RGB output, and Aperture is the aperture setting (e.g., f/4) of the image, and Exposure Time is the exposure time setting of the image (e.g. 1/60 of a second), and ISO is the sensor's sensitivity setting of the image (e.g., ISO=100), and k is a camera specific parameter that is derived from a camera calibration described herein.

In operation 14, the method can then determine an estimated ambient light level of the captured image which is based on the scaled pixel values. In one embodiment, the estimated ambient light level can be derived or determined from a median or mean of all of the pixel values in the image. In another embodiment, the estimated ambient light level can be determined from the median or mean of a salient portion of the image. In one embodiment, the estimated ambient light level can be determined from the maximum value of the pixels in the image. In one embodiment, the estimated ambient light level can be determined from a median or mean of luminance values in a selected range of luminance values between a maximum luminance value in the image and a minimum luminance value in the image. In one embodiment, the estimated ambient light level of the captured image can be determined from an ambient light sensor reading on the device or an exposure sensor reading or from a manual user input.

In operation 16, the method can store the estimated ambient light level as metadata which can be used in further processing of the image in subsequent processing steps. Optionally, the metadata can be stored along with other metadata about the image as well as metadata about the target display and metadata about the source or the capture device such as the camera which was used to capture the image. In operation 18, the device can then compute a correction curve, such as an optical-optical transfer function (OOTF) using the estimated ambient light level and the metadata about the viewing environment of the target display. In one embodiment, the OOTF can be configured to preserve an apparent contrast of the image under the estimated ambient light level while in a viewing environment when the image is displayed in the viewing environment. For example, the OOTF can preserve the apparent contrast by adjusting image data in relatively dark regions of the image to reduce contrast in the relatively dark regions when the estimated ambient light level has a higher luminance than the luminance of the viewing environment; conversely, the OOTF can preserve the apparent contrast by adjusting image data in relatively dark regions of the image to increase contrast in the relatively dark regions of the image when the estimated ambient light level has a lower luminance than the luminance of the viewing environment. In one embodiment, the metadata about the viewing environment can be a predetermined value of the viewing environment such as a reference level of five (5) nits. In another embodiment, the metadata can be derived from an ambient light sensor which dynamically measures the ambient light of the viewing environment of the display device in the viewing environment; in other words, the ambient light sensor can be an ambient light sensor attached to or near the target display and that ambient light sensor can measure the ambient light of the viewing environment while a user is using the target display and viewing the image on the target display. The metadata about the target display can also include information about the gamut of the target display and the luminance parameters of the target display such as the maximum and minimum luminance values that the target display can present on the target display device.

In operation 20, the device can correct the image data, which can be expressed in pixel values in absolute scene light values using the correction curve such as the OOTF described herein. In one embodiment, operation 20 can be dependent upon whether the user selected a manual exposure compensation on the camera when the image was captured. For example, in one embodiment, the image data may not be corrected by the OOTF described herein when the user has selected a manual exposure compensation, such as a underexposure or overexposure manual compensation setting which was selected by the user when the image was captured. Many cameras include controls (e.g., knobs, etc.) that allow the use to manually set the camera to underexpose or overexpose the image, and many cameras also allow the user to manually set the exposure by allowing the user to manually select aperture, exposure time and ISO (sensor sensitivity). Moreover, the correction can also be skipped in embodiments when the user has set the camera using a manual exposure setting such as an exposure setting which does not use the automatic exposure mode of the camera. When operation 20 is used in the device (e.g., when automatic exposure was used without manual compensation), it will correct the image to preserve the contrast as described herein in one or more embodiments.

Operation 22 can follow operation 20 and can include the use of a tone mapping function which can compress the dynamic range of an image so that it is suitable to be displayed on a target display which may have a lower dynamic range than a reference display. The tone mapping function can map luminance values and other functions can also adjust color channel values to preserve saturation and hue on target display devices using techniques that are known in the art, such as those techniques associated with Dolby Vision which provide techniques for display management for a variety of different target displays. In one embodiment, operations 20 and 22 can be performed concurrently by an operation which simultaneously corrects the image data and tone maps the image data.

The resulting image from operations 20 and 22 can then in one embodiment be displayed on a target display in the viewing environment; this is shown as operation 24 in FIG. 1.

Figure 2:
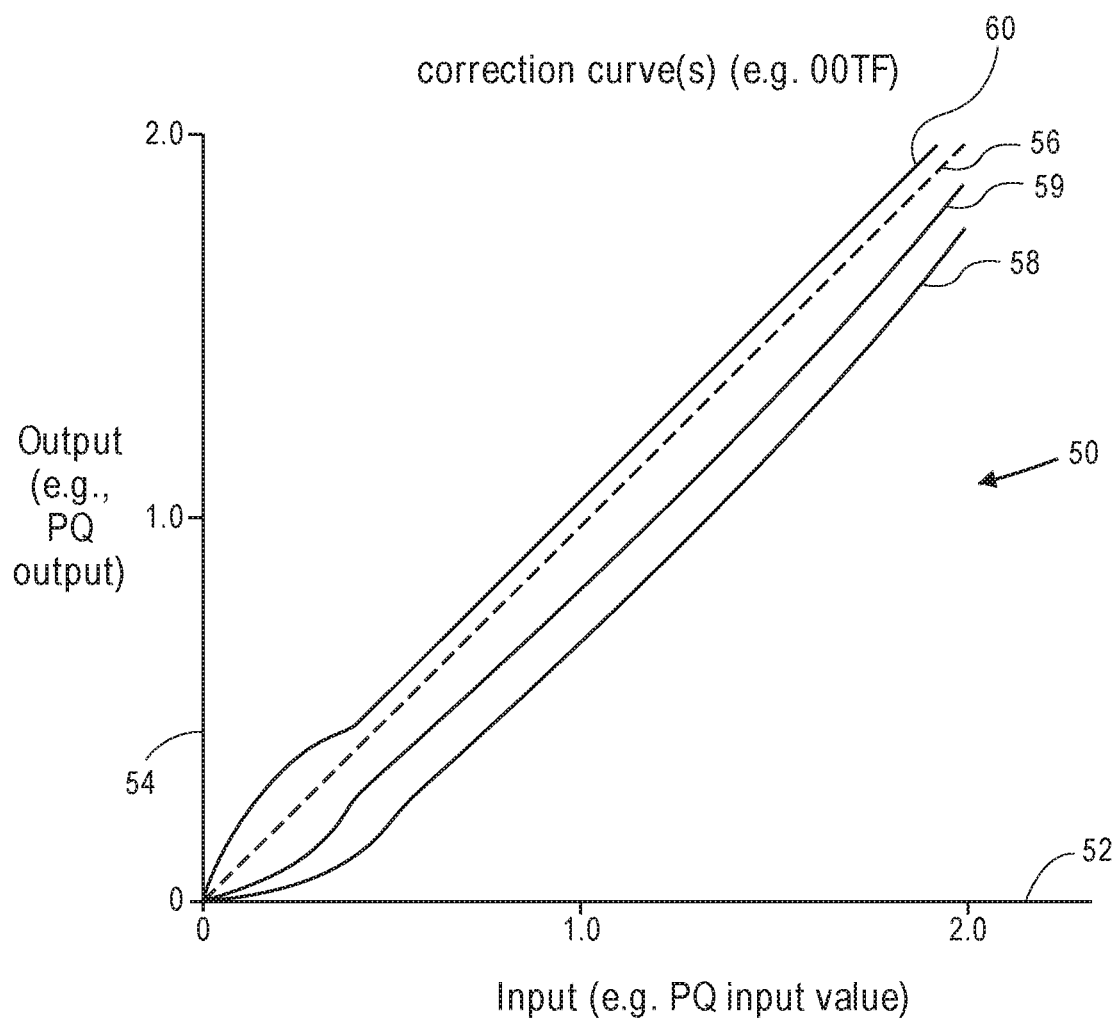
FIG. 2 shows an embodiment of correction curves or functions that can be used in one or more embodiments of the invention.

FIG. 2 shows examples of correction curves which in one embodiment can be implemented with one or more optical-optical transfer functions. An optical-optical transfer function (OOTF) as described herein may be applied to convert scene light levels of an original scene, as represented in scene images captured from the original scene, to mapped light levels. The mapped light levels can be used to represent, or further mapped to generate, display light levels in display images to be rendered by one or more display devices. Examples of OOTFs can be found in Recommendation ITU-R BT.2100-0 (07/2016), which is incorporated herein by reference. The curves shown in FIG. 2 are meant to be examples of different types of corrections that can be implemented with OOTF's; other curves, having different shapes than those shown in FIG. 2, can alternatively be used to correct images in the methods and systems described herein. The graph 50 shows an X axis 52 representing input values and a Y axis 54 representing output values derived from the OOTF function based on the input value supplied to the function. Curve 56 shows an example of a correction curve which does not correct the image data; in other words the input value will equal the output value for all possible input values. In one embodiment, the correction curve 56 can be considered a reference correction curve from which the OOTF corrects the image data. In one embodiment, the reference correction curve 56 can be different than a straight line sloped at 450 on the graph 50. Correction curves 58 and 59 show two examples of correction curves which can be used in one embodiment when the ambient light level (of the original scene) is greater than the light level of the viewing environment. In the example of these correction curves 58 and 59, these curves preserve the apparent contrast of the original scene by adjusting image data in relatively dark regions of the image to reduce contrast in the relatively dark regions when the estimated ambient light level has a higher luminance than the luminance of the viewing environment. Correction curve 60 is another correction curve which can be used when the ambient light level is less than the light level of the viewing environment. Correction curve 60 is an example of a correction that can preserve the apparent contrast by adjusting image data in relatively dark regions of the image to increase contrast in the relatively dark regions of the image when the estimated ambient light level has a lower luminance than the luminance of the viewing environment. In one embodiment, the light level of the viewing environment can be set at a predetermined value such as five nits. In another embodiment, the light level of the viewing environment can be dynamically determined from an ambient light sensor, such as an ambient light sensor which is integrated into the target display. For example, a smart phone can have a target display and also can have at least one ambient light sensor which can be used to dynamically measure the ambient light of the viewing environment which in turn can control the use of the OOTF function according to the one or more methods described herein. It will be appreciated that if the reference correction curve, such as the correction curve 56 is different than a straight line as shown in FIG. 2, the shapes of the other correction curves may look different than those shown in FIG. 2. In one embodiment, the input to the correction curve can be absolute scene values that have been generated based upon a scaling operation, such as the scaling operation in operation 12 of FIG. 1.

Figure 3:
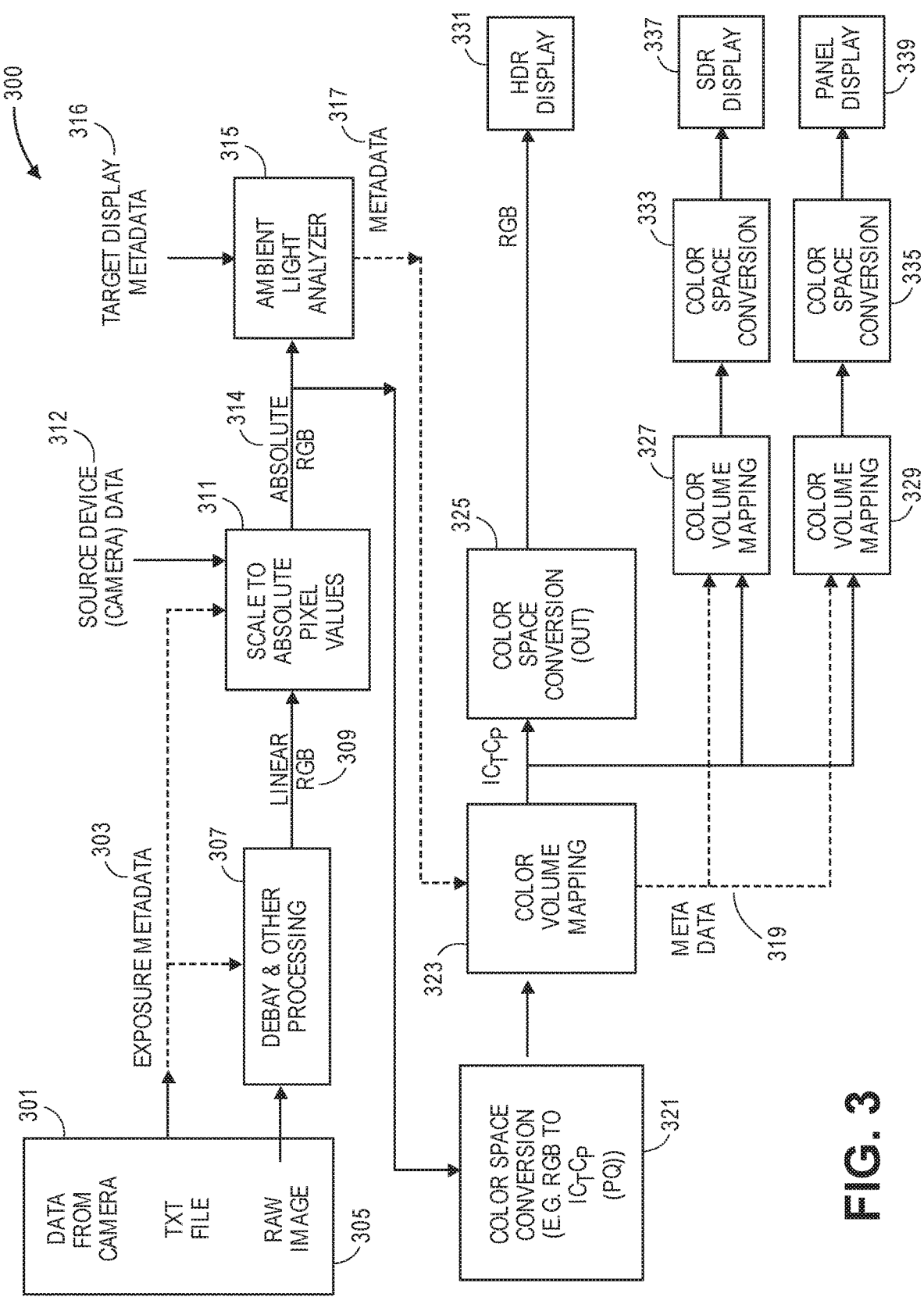
FIG. 3 shows an example of a system having a set of operations that can be used with one or more embodiments of the invention.

An example of a set of processing operations according to one embodiment will now be described while referring to FIG. 3. The blocks shown in FIG. 3 can represent processing operations which can be performed in a data processing system which can be included in a camera or other device which includes the camera or in another device which receives data from the camera but is not itself a camera. The blocks shown in FIG. 3 can be processed in special-purpose hardware or can be processed with software executing on a general-purpose processor which is coupled to receive data from the camera or which includes a camera as part of the system. The operations can begin when the system receives data from camera 301. In one embodiment, the data from camera 301 can include text data in a text file which can specify exposure metadata 303 such as the aperture setting of the image, the exposure time of the image, and the sensor sensitivity level of the image. The data from camera 301 also includes image data 305 which can be RAW image data as is known in the art. In one embodiment, the image data 305 can be processed by an image signal processing 307 which can perform processing operations such as debayering processing and other processing operations known in the art to process the image prior to further operations on the image. In one embodiment, the exposure metadata 303 can be used as an input to the processing operations in the image signal processing 307. The output from the image signal processing 307 can in one embodiment provide linear RGB pixel values 309 to a scaler 311. In one embodiment, the scaler 311 can receive the exposure metadata 303 and the source device data 312 to scale the pixel values into absolute pixel values. In one embodiment, the scaler 311 can use the following equation to scale the linear RGB pixel values 309 into absolute RGB pixel values 314:

$$\text{Absolute Luminance} = \frac{(\text{Relative Camera Exposure} * \text{Aperture}^2)}{(\text{Exposure Time} * \textit{ISO}) * k}$$

wherein Relative Camera Exposure can represent a per pixel exposure value derived from the image sensor's RGB output, and Aperture is the aperture setting (e.g., f/4) of the image, and Exposure Time is the exposure time setting of the image (e.g. 1/60 of a second), and ISO is the sensor's sensitivity setting of the image (e.g., ISO=100), and k is a camera specific parameter that is derived from a camera calibration described herein.

The output of the equation provides, for each pixel, an absolute pixel value representing the absolute scene light level for that pixel. The output of the absolute RGB pixel values 314 can then be provided to the ambient light analyzer 315 for further processing as described further below. The other input to the scaler 311 is the source device data 312 which include a constant value (e.g. k) that is based upon camera calibration. In one embodiment, a representative camera from a camera manufacturer or a representative smart phone from a smart phone manufacturer can be used in a series of one or more calibration operations to derive the constant value (a camera specific parameter) which can then be stored for use in processing images acquired by that camera for that particular device. In one embodiment, as long as the sensor design of the camera does not change, the constant value can remain valid for that camera (e.g. a particular camera or smartphone model) and be used in processing software which can be distributed for use with that camera to provide the operations shown in FIG. 3 or FIG. 1 or otherwise described in this description. In one embodiment, the camera calibration operation can include capturing one or more images of a test target at different exposure parameter settings and measuring the luminance of the test target at the position of the camera and then solving for a value of the constant value that best fits the function or equation shown above which includes the camera specific parameter and the exposure parameters. The camera specific parameter can be derived from the representative camera and then stored for use in similar cameras having the same sensor design as the representative camera or device. In this example, the camera specific value or the constant K is the only value not known in the equation because the exposure parameter settings and the luminance of the test target (at the camera's position) are known and thus the constant value or camera specific parameter can be solved for. In one embodiment, multiple images are acquired at different exposure parameter settings and at different light intensities thereby providing an array of values which can then be used to derive the best fit for the constant value.

The ambient light analyzer 315 receives the absolute RGB pixel values 314 and computes the ambient light level or estimated ambient light level based on the absolute RGB pixel values 314 as described herein. For example, the ambient light analyzer 315 can calculate a mean or median of the luminance values of all of the absolute RGB pixel values 314. That mean or median can represent the estimated ambient light level of the scene (in absolute light levels) and can be used to select a correction curve for an optical-optical transfer function as described above in conjunction with FIG. 2. In one embodiment, the ambient light analyzer 315 can also receive information about the display such as the target display, and this information can be metadata about the target display 316. This metadata 316 can be provided along with other metadata in the metadata 317 from the ambient light analyzer 315. In one embodiment, metadata 317 includes the target display metadata 316 and also includes the estimated ambient light level of the scene which can then be used in further processing operations to be described further below. The target display metadata 316 can include metadata about the particular target display or set of displays on which the image may be displayed. For example, the target display metadata 316 can include metadata about the color gamut of the target display and its capabilities with respect to displaying various levels of luminance including maximum and minimum luminance values, and other information about the target display. In one embodiment, the target display metadata can be similar to the target display metadata that is used in Dolby's Display Management system. In one embodiment, the target display metadata 316 can also additionally include an ambient light level of the viewing environment of the target display; for example, if the target display incorporates an ambient light sensor, the output from that ambient light sensor can be used to provide an ambient light level of the viewing environment as part of that target display metadata 316.

The output of the metadata 317 from the ambient light analyzer 315 can be provided to the color volume mapping 323. The output of the scaler 311 which includes the absolute RGB pixel values 314 can be provided as an input to the color space conversion 321. In one embodiment, the color space conversion 321 can convert absolute RGB pixel values into absolute $IC_TC_P$ values, and these values can be in a color space which utilizes perceptual quantization (PQ).

The term "PQ" as used herein refers to perceptual quantization. The human visual system responds to increasing light levels in a very non-linear way. A human's ability to see a stimulus is affected by the luminance of that stimulus, the size of the stimulus, the spatial frequency(ies) making up the stimulus, and the luminance level that the eyes have adapted to at the particular moment one is viewing the stimulus, among other factors. In a preferred embodiment, a perceptual quantizer function maps linear input gray levels to output gray levels that better match the contrast sensitivity thresholds in the human visual system. Examples of PQ mapping functions are described in PCT Application with Ser. Number PCT/US2012/068212 (to be referred as the '212 application) titled "Perceptual luminance nonlinearity-based image data exchange across different display capabilities," by J. S. Miller et al., filed on Dec. 6, 2012, and incorporated herein by reference in its entirety, where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, which represents the response curve of a physical cathode ray tube (CRT) device and coincidently may have a very rough similarity to the way the human visual system responds, a PQ curve, as determined by the '212 application, imitates the true visual response of the human visual system using a relatively simple functional model.

The output of color space conversion 321 can be provided to the color volume mapping 323 which can perform tone mapping and other image processing operations in order to compress the color values such that they can be properly displayed on the target display or set of target displays based upon for example the target display metadata 316. In one embodiment, the color volume mapping 323 can perform the correction of image data using the OOTF; in other words, color volume mapping 323 can perform operations 18 and 20 shown in FIG. 1 to correct the image data using the selected correction curve based upon the estimated ambient light level provided or calculated in operation 14 of FIG. 1. In addition, the color volume mapping 323 can perform tone mapping (e.g., in operation 22 of FIG. 1) based upon the target display's metadata, such as target display metadata 316. In one embodiment, the tone mapping function is configured based upon the gamut and luminance parameters of the target display, where those parameters are provided as part of the target display metadata 316. In one embodiment, the color volume mapping 323 can perform color gamut mapping and tone mapping in accordance with Dolby's Display Management system. In one embodiment, the tone mapping operations or functions compress a dynamic range of the image to match the gamut and luminance capabilities of the target display. In one embodiment, the correcting through the OOTF and the tone mapping can be performed simultaneously through a correction function that includes both the OOTF and tone mapping functions. In one embodiment, the color volume mapping 323 can perform both operations 20 and 22 shown in FIG. 1.

The output of pixel data from the color volume mapping 323 can be provided to the color space conversion 325 which can convert the pixel data in $IC_TC_P$ back into RGB values for display on a high dynamic range display 331. The pixel output from color volume mapping 323 can also be provided in one embodiment to two other color volume mapping operations shown as color volume mapping 327 and color volume mapping 329 which can perform color mapping operations which are similar to the operations performed by color volume mapping 323 in order to provide outputs to a standard dynamic range display 337 and a panel display 339. In addition, color volume mapping 327 and color volume mapping 329 also receive metadata 319 which can be the same as metadata 317 or metadata that is been corrected by color volume mapping or tone mapping operations by the color volume mapping 323. The metadata 319 can include metadata about each of the target displays and in particular can include metadata about the standard dynamic range display 337 and metadata about the panel display 339. The outputs from color mapping 327 and color volume mapping 329 are provided to their respective color space conversion operations 333 and 335 respectively in order to provide outputs to the appropriate display. The panel display 339 may be an example of a target display which includes an integrated ambient light sensor which can be used to dynamically adjust the OOTF function based upon the output from the integrated ambient light sensor.

In one embodiment, one or more systems or methods can utilize the detection of flare in an image. Upon detecting flare, a flare compensation can be calculated as a function of a value representing the estimated ambient light level. For example, the estimated ambient light level can be used to determine whether flare exists and to compensate for flare in the image so that the calculated absolute light level is not corrupted by the flare in the image.

In one embodiment, the color volume mapping for a standard dynamic range display can use local tone mapping to better preserve detail in highlight regions. For example, the color volume mapping 327 can utilize local tone mapping for different regions of the image in order to better preserve detail in the highlight regions for display on the standard dynamic range display 337. In one embodiment, the metadata about the image including the ambient light level data such as the estimated ambient light level can be saved with the image and used later in conversions of the image such as a conversion of the SDR image into an HDR image. In one embodiment, an HDR pipeline can attempt to inherent some of the look from the SDR image by using, for example a histogram of the SDR luminance and transfer it to a tone curve so that the HDR histogram has similar characteristics such as brightness and contrast to the SDR histogram. This can also be done on color for example by solving a 3×3 matrix or by RGB tone curves, etc. Manual exposure adjustments can be made exempt from the use of the calculation of the absolute scene light levels, but the manual exposure adjustments can in one embodiment also be used to populate metadata about a region of interest; for example if the user selects a part of an image as part of a manual exposure adjustment or it is automatically selected as in the case of face detection, then the luminance of that region can be used as a mid-offset to populate metadata about a region of interest and this can allow display management to prioritize this region when mapping to HDR or to SDR.

Figure 4:
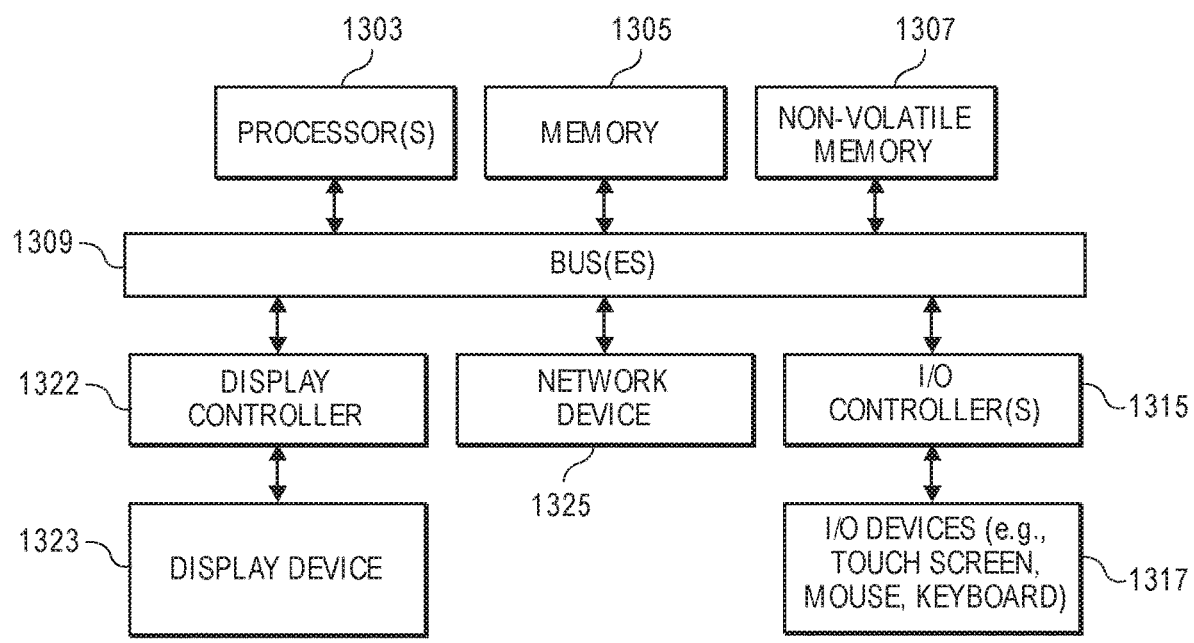
FIG. 4 shows an example of a data processing system that can be used to perform or implement one or more embodiments of the invention.

FIG. 4 shows an example of a data processing system that can be used by or in a camera or other device to provide one or more embodiments described herein. The systems and methods described herein can be implemented in a variety of different data processing systems and devices, including general-purpose computer systems, special purpose computer systems, or a hybrid of general purpose and special purpose computer systems. Data processing systems that can use any one of the methods described herein include a camera, a smartphone, a set top box, a computer, such as a laptop or tablet computer, embedded devices, game systems, and consumer electronic devices, etc., or other electronic devices.

FIG. 4 is a block diagram of data processing system hardware according to an embodiment. Note that while FIG. 4 illustrates the various components of a data processing system, it is not intended to represent any particular architecture or manner of interconnecting the components as such details are not germane to the present invention. It will also be appreciated that other types of data processing systems that have fewer components than shown or more components than shown in FIG. 4 can also be used with one or more embodiments of the present invention.

As shown in FIG. 4, the data processing system includes one or more buses 1309 that serve to interconnect the various components of the system. The system in FIG. 4 can include a camera or be coupled to a camera. One or more processors 1303 are coupled to the one or more buses 1309 as is known in the art. Memory 1305 may be DRAM or non-volatile RAM or may be flash memory or other types of memory or a combination of such memory devices. This memory is coupled to the one or more buses 1309 using techniques known in the art. The data processing system can also include non-volatile memory 1307, which may be a hard disk drive or a flash memory or a magnetic optical drive or magnetic memory or an optical drive or other types of memory systems that maintain data even after power is removed from the system. The non-volatile memory 1307 and the memory 1305 are both coupled to the one or more buses 1309 using known interfaces and connection techniques. A display controller 1322 is coupled to the one or more buses 1309 in order to receive display data to be displayed on a display device which can be one of displays 331, 337 or 339. The data processing system can also include one or more input/output (I/O) controllers 1315 which provide interfaces for one or more I/O devices, such as one or more cameras, touch screens, ambient light sensors, and other input devices including those known in the art and output devices (e.g. speakers). The input/output devices 1317 are coupled through one or more I/O controllers 1315 as is known in the art. The ambient light sensors can be integrated into the system in FIG. 4.

While FIG. 4 shows that the non-volatile memory 1307 and the memory 1305 are coupled to the one or more buses directly rather than through a network interface, it will be appreciated that the present invention can utilize non-volatile memory that is remote from the system, such as a network storage device which is coupled to the data processing system through a network interface such as a modem or Ethernet interface. The buses 1309 can be connected to each other through various bridges, controllers and/or adapters as is well known in the art. In one embodiment the I/O controller 1315 includes one or more of a USB (Universal Serial Bus) adapter for controlling USB peripherals, an IEEE 1394 controller for IEEE 1394 compliant peripherals, or a Thunderbolt controller for controlling Thunderbolt peripherals. In one embodiment, one or more network device(s) 1325 can be coupled to the bus(es) 1309. The network device(s) 1325 can be wired network devices (e.g., Ethernet) or wireless network devices (e.g., WiFi, Bluetooth) that receive images from a camera, etc.

Although separate embodiments are enumerated below, it will be appreciated that these embodiments can be combined or modified, in whole or in part, into various different combinations. The combinations of these embodiments can be any one of all possible combinations of the separate embodiments.

Embodiment 1 is a method comprising:

capturing an image through a camera, the captured image including a first plurality of image data representing pixels in the image;

determining an estimated ambient light level of the captured image based on the first plurality of image data, wherein the estimated ambient light level is determined by scaling pixel values from a sensor in the camera using a function that includes a camera specific parameter and exposure parameters used on the camera when the image was captured to obtain one or more absolute scene light levels, the exposure parameters including an aperture setting, an exposure time setting and a sensor sensitivity setting and wherein the camera specific parameter is derived from a camera calibration;

computing an optical-optical transfer function (OOTF) based on the estimated ambient light level; and transforming image data derived from the first plurality of image data by correcting the image data derived from the first plurality of image data using the OOTF, the transforming configured to preserve an apparent contrast of the image under the estimated ambient light level in a viewing environment when the image is displayed in the viewing environment.

Embodiment 2 is a method of embodiment 1 wherein the method further comprises:

mapping, through a tone mapping function configured for a target display, image data derived from the first plurality of image data to map the image for display on the target display, the tone mapping function configured based on the gamut and luminance parameters of the target display.

Embodiment 3 is a method of embodiment 2, wherein the transforming corrects the image data derived from the first plurality of image data before the mapping through the tone mapping function such that the tone mapping function operates on data derived from the transforming.

Embodiment 4 is a method of embodiment 3 wherein the tone mapping function compresses a dynamic range of the image to match the gamut and luminance parameters of the target display.

Embodiment 5 is a method of embodiment 2, wherein the transforming and the mapping are performed simultaneously by the tone mapping function which incorporates the OOTF.

Embodiment 6 is a method of embodiment 2 wherein the estimated ambient light level is saved as metadata with image data of the image, and wherein the tone mapping is performed on pixel values scaled to absolute scene light levels.

Embodiment 7 is a method of embodiment 6 wherein the camera specific parameter is a constant value derived empirically from the camera calibration.

Embodiment 8 is a method of embodiment 7 wherein the camera calibration comprises: capturing images of a test target at different exposure parameter settings and measuring the luminance of the test target and solving for a value of the constant value that best fits a function that includes the camera specific parameter and the exposure parameters.

Embodiment 9 is a method of embodiment 8 wherein the camera specific parameter is derived from the camera calibration of the camera and then stored for use in similar cameras having the same sensor design as the camera.

Embodiment 10 is a method of embodiment 7 wherein the estimated ambient light levels is derived from one of: a median or mean of luminance values of all pixels in the image; a median or mean of luminance values of a scene image portion; a median or mean of luminance values in a selected range of luminance values between a maximum luminance value in the image and a minimum luminance value in the image; a maximum luminance value in the image; an ambient light sensor reading; an exposure sensor reading; data from pixels dedicated to optimizing exposure; or a manual user input.

Embodiment 11 is a method of embodiment 7 wherein the OOTF corrects the image data based on a difference between the estimated ambient light and a predetermined or dynamically measured ambient light of the viewing environment and wherein the OOTF corrects the image data when the camera was set in automatic exposure mode but the image is displayed, without the OOTF correction, on the target display in the viewing environment when the camera was set with a manual exposure adjustment.

Embodiment 12 is a method of embodiment 11 wherein the manual exposure adjustments comprises one of: a manual exposure setting or an exposure compensation setting that was manually selected.

Embodiment 13 is a method of embodiment 11 wherein the predetermined ambient light of the viewing environment is 5 nits.

Embodiment 14 is a method of embodiment 11 wherein the dynamically measured ambient light of the viewing environment is measured by an ambient light sensor that is integrated into the target display so that the OOTF is dynamically controlled by the output of the ambient light sensor.

Embodiment 15 is a method of embodiment 6 wherein the OOTF corrects the image data when the camera was used in automatic exposure mode but the image is displayed, without the OOTF correction, on the target display in the viewing environment when the camera was set with a manual exposure adjustment; and wherein the camera is one of: a camera integrated into a smartphone; a camera integrated into a tablet computer; a single lens reflex camera; a mirrorless camera; or a device with a lens that focuses the image onto the sensor, a storage device and a control system coupled to the sensor and the storage device.

Embodiment 16 is a method of embodiment 6 further comprising: estimating a white point of the image using the absolute light levels and applying a chromatic adapting transform to convert the image to a reference adapting white point.

Embodiment 17 is a method of embodiment 6 wherein the OOTF preserves the apparent contrast by adjusting image data in relatively dark regions of the image to reduce contrast in the relatively dark regions when the estimated ambient light level has a higher luminance than the luminance of the viewing environment, and the OOTF preserves the apparent contrast by adjusting image data in relatively dark regions of the image to increase contrast in the relatively dark regions of the image when the estimated ambient light level has a lower luminance than the luminance of the viewing environment.

Embodiment 18 is a method of embodiment 6 wherein the metadata is used to compensate flare in the image, where the flare compensation is a function of a value representing the estimated ambient light level.

Embodiment 19 is a method of embodiment 6 wherein the tone mapping function includes local tone mapping in one or more regions of the image, and the local tone mapping is used during mapping to create a standard dynamic range (SDR) image from the captured image.

Embodiment 20 is a method of embodiment 19 wherein the metadata is saved with the SDR image for use in reconstructing a high dynamic range (HDR) image via inverse mapping.

Embodiment 21 is a method of embodiment 20 wherein the metadata is used to calculate multivariate, multiple regression (MMR) coefficients for inverse mapping from the SDR image to the HDR image.

Embodiment 22 is a method of embodiment 6 wherein the metadata is adjusted by the tone mapping to an intermediate set of metadata to guide downstream processing of a tone mapped image.

Embodiment 23 is an apparatus comprising a processing system and memory and configured to perform any one of the methods in embodiments 1-22.

Embodiment 24 is a non-transitory machine-readable storage storing executable program instructions which when executed by a machine cause the machine to perform any one of the methods of embodiments 1-22.

It will be apparent from this description that one or more embodiments of the present invention may be embodied, at least in part, in software. That is, the techniques may be carried out in a data processing system in response to its one or more processors executing a sequence of instructions contained in a storage medium, such as a non-transitory machine-readable storage medium (e.g. DRAM or flash memory). In various embodiments, hardwired circuitry may be used in combination with software instructions to implement the present invention. Thus the techniques are not limited to any specific combination of hardware circuitry and software, or to any particular source for the instructions executed by the data processing system.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A method comprising:
   receiving an image captured by a camera, the image including a first plurality of image data representing pixels in the image;
   determining an estimated ambient light level of the image based on the first plurality of image data, wherein the estimated ambient light level is determined by scaling pixel values from a sensor in the camera using a function that includes a camera specific parameter and exposure parameters used on the camera when the image was captured to obtain one or more absolute scene light levels, the exposure parameters including an aperture setting, an exposure time setting and a sensor sensitivity setting and wherein the camera specific parameter is derived from a camera calibration;
   computing an optical-optical transfer function, OOTF, based on the estimated ambient light level;
   transforming image data derived from the first plurality of image data by correcting the image data derived from the first plurality of image data using the OOTF, the transforming configured to preserve an apparent contrast of the image under the estimated ambient light level in a viewing environment when the image is displayed on a target display in the viewing environment, wherein the OOTF includes corrects the image data based on a difference between the estimated ambient light and a predetermined or dynamically measured ambient light of the viewing environment and wherein the OOTF corrects the image data when the camera was set in automatic exposure mode but the image is displayed, without the OOTF correction, on the target display in the viewing environment when the camera was set with a manual exposure adjustment;
   mapping, through a tone mapping function configured for the target display, image data derived from the first plurality of image data to map the image for display on the target display, the tone mapping function configured based on the gamut and luminance parameters of the target display, and wherein the mapping, through the tone mapping function, is performed after the transforming.

2. The method of claim 1, wherein the transforming corrects the image data derived from the first plurality of image data before the mapping through the tone mapping function such that the tone mapping function operates on data derived from the transforming and wherein the tone mapping function compresses a dynamic range of the image to match the gamut and luminance parameters of the target display.

3. The method of claim 1 wherein the estimated ambient level is saved as metadata with image data of the image, and wherein tone mapping through the tone mapping function is performed on pixel values scaled to absolute scene light levels and wherein the camera specific parameter is a constant value derived empirically from the camera calibration.

4. The method of claim 3 wherein the metadata is used to compensate flare in the image, where the flare compensation is a function of a value representing the estimated ambient light level.

5. The method of claim 1 wherein the camera calibration comprises:
   capturing images of a test target at different exposure parameter settings and measuring the luminance of the test target and solving for a value of the constant value that best fits a function that includes the camera specific parameter and the exposure parameters and wherein the camera specific parameter is derived from the camera calibration of the camera and then stored for use in similar cameras having the same sensor design as the camera and wherein the estimated ambient light levels is derived from one of:
   a median or mean of luminance values of all pixels in the image;

a median or mean of luminance values of a scene image portion;

a median or mean of luminance values in a selected range of luminance values between a maximum luminance value in the image and a minimum luminance value in the image; or.

6. The method of claim 1 wherein the dynamically measured ambient light of the viewing environment is measured by an ambient light sensor that is integrated into the target display so that the OOTF is dynamically controlled by the output of the ambient light sensor.

7. The method of claim 1 wherein the OOTF corrects the image data when the camera was used in automatic exposure mode but the image is displayed, without the OOTF correction, on the target display in the viewing environment when the camera was set with a manual exposure adjustment; and wherein the camera is one of:
    a camera integrated into a smartphone;
    a camera integrated into a tablet computer;
    a single lens reflex camera;
    a mirrorless camera; or
    a device with a lens that focuses the image onto the sensor,
    a storage device and a control system coupled to the sensor and the storage device.

8. The method of claim 1 further comprising:
    estimating a white point of the image using the absolute light levels and applying a chromatic adapting transform to convert the image to a reference adapting white point.

9. The method of claim 1 wherein the OOTF preserves the apparent contrast by adjusting image data in relatively dark regions of the image to reduce contrast in the relatively dark regions when the estimated ambient light level has a higher luminance than the luminance of the viewing environment, and the OOTF preserves the apparent contrast by adjusting image data in relatively dark regions of the image to increase contrast in the relatively dark regions of the image when the estimated ambient light level has a lower luminance than the luminance of the viewing environment.

10. The method of claim 1 wherein the tone mapping function includes local tone mapping in one or more regions of the image, and the local tone mapping is used during mapping to create a standard dynamic range, SDR, image from the image and wherein the metadata is saved with the SDR image for use in reconstructing a high dynamic range, HDR, image via inverse mapping.

11. The method of claim 10 wherein the metadata is used to calculate multivariate, multiple regression, MMR, coefficients for inverse mapping from the SDR image to the HDR image and wherein the metadata is adjusted by the tone mapping to an intermediate set of metadata to guide downstream processing of a tone mapped image.

12. An apparatus comprising a processing system and memory and configured to perform the method in claim 1.

13. A non-transitory machine-readable storage storing executable program instructions which when executed by a machine cause the machine to perform the method of claim 1.

* * * * *